(12) United States Patent
Okada et al.

(10) Patent No.: US 9,462,153 B2
(45) Date of Patent: Oct. 4, 2016

(54) IMAGE PROCESSING APPARATUS, IMAGE READING APPARATUS, AND NON-TRANSITORY COMPUTER READABLE MEDIUM

(71) Applicant: FUJI XEROX CO., LTD., Tokyo (JP)

(72) Inventors: Shigeru Okada, Yokohama (JP);
Katsuya Koyanagi, Yokohama (JP);
Minoru Sodeura, Yokohama (JP);
Shintaro Adachi, Yokohama (JP);
Shinji Hanaoka, Yokohama (JP);
Hiroyuki Kishimoto, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/528,119

(22) Filed: Oct. 30, 2014

(65) Prior Publication Data
US 2015/0229806 A1    Aug. 13, 2015

(30) Foreign Application Priority Data

Feb. 10, 2014    (JP) ................................. 2014-023460

(51) Int. Cl.
*H04N 1/32*    (2006.01)
*G06F 17/24*    (2006.01)
*G06K 9/00*    (2006.01)

(52) U.S. Cl.
CPC ...... *H04N 1/32352* (2013.01); *G06K 9/00442* (2013.01); *H04N 2201/0081* (2013.01); *H04N 2201/3232* (2013.01)

(58) Field of Classification Search
CPC ................. H04N 1/32352; H04N 2201/0081; H04N 2201/3232; G06F 17/243; G06K 9/00442

USPC ................. 358/448, 1.15, 1.9, 462
See application file for complete search history.

(56) References Cited

U.S. PATENT DOCUMENTS

| 2007/0237427 A1* | 10/2007 | Patel | G06K 9/00442 382/305 |
| 2008/0174790 A1* | 7/2008 | Noguchi | H04N 1/2179 358/1.1 |

FOREIGN PATENT DOCUMENTS

| JP | 05-225304 A | 9/1993 |
| JP | 4046231 B2 | 2/2008 |

OTHER PUBLICATIONS

Communication dated Dec. 2, 2014 from the Japanese Patent Office in counterpart application No. 2014-023460.

\* cited by examiner

*Primary Examiner* — Quang N Vo
(74) *Attorney, Agent, or Firm* — Sughrue Mion, PLLC

(57) ABSTRACT

An image processing apparatus includes an extracting unit that extracts identification information items from image information items of a document group that includes plural individual documents, each of the identification information items being included in a corresponding one of the individual documents, a corresponding information generating unit that generates corresponding information items that indicate corresponding relationships between the identification information items and the image information items of the individual documents, and an electronic document generating unit that rearranges an order of the identification information items on the basis of contents of the identification information items and generates an electronic document that includes the image information items of the document group, the corresponding information items, and the identification information items that have been sorted.

11 Claims, 7 Drawing Sheets

IMAGE PROCESSING APPARATUS, IMAGE READING APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2014-023460 filed Feb. 10, 2014.

BACKGROUND (i) Technical Field

The present invention relates to an image processing apparatus, an image reading apparatus, and a non-transitory computer readable medium.

(ii) Related Art

In the related art, paper documents have been converted to electronic files by being read by an image reading apparatus and have been managed as electronic files. Accordingly, there is a need for a technique to improve the convenience of electronic files.

SUMMARY

According to an aspect of the invention, there is provided an image processing apparatus including an extracting unit that extracts identification information items from image information items of a document group that includes plural individual documents, each of the identification information items being included in a corresponding one of the individual documents, a corresponding information generating unit that generates corresponding information items that indicate corresponding relationships between the identification information items and the image information items of the individual documents, and an electronic document generating unit that rearranges an order of the identification information items on the basis of contents of the identification information items and generates an electronic document that includes the image information items of the document group, the corresponding information items, and the identification information items that have been sorted.

BRIEF DESCRIPTION OF THE DRAWINGS

An exemplary embodiment of the present invention will be described in detail based on the following figures, wherein.

DETAILED DESCRIPTION

An image reading apparatus according to an exemplary embodiment of the present invention will be described below. Note that the present invention is not limited to the following exemplary embodiment.

Figure 1:
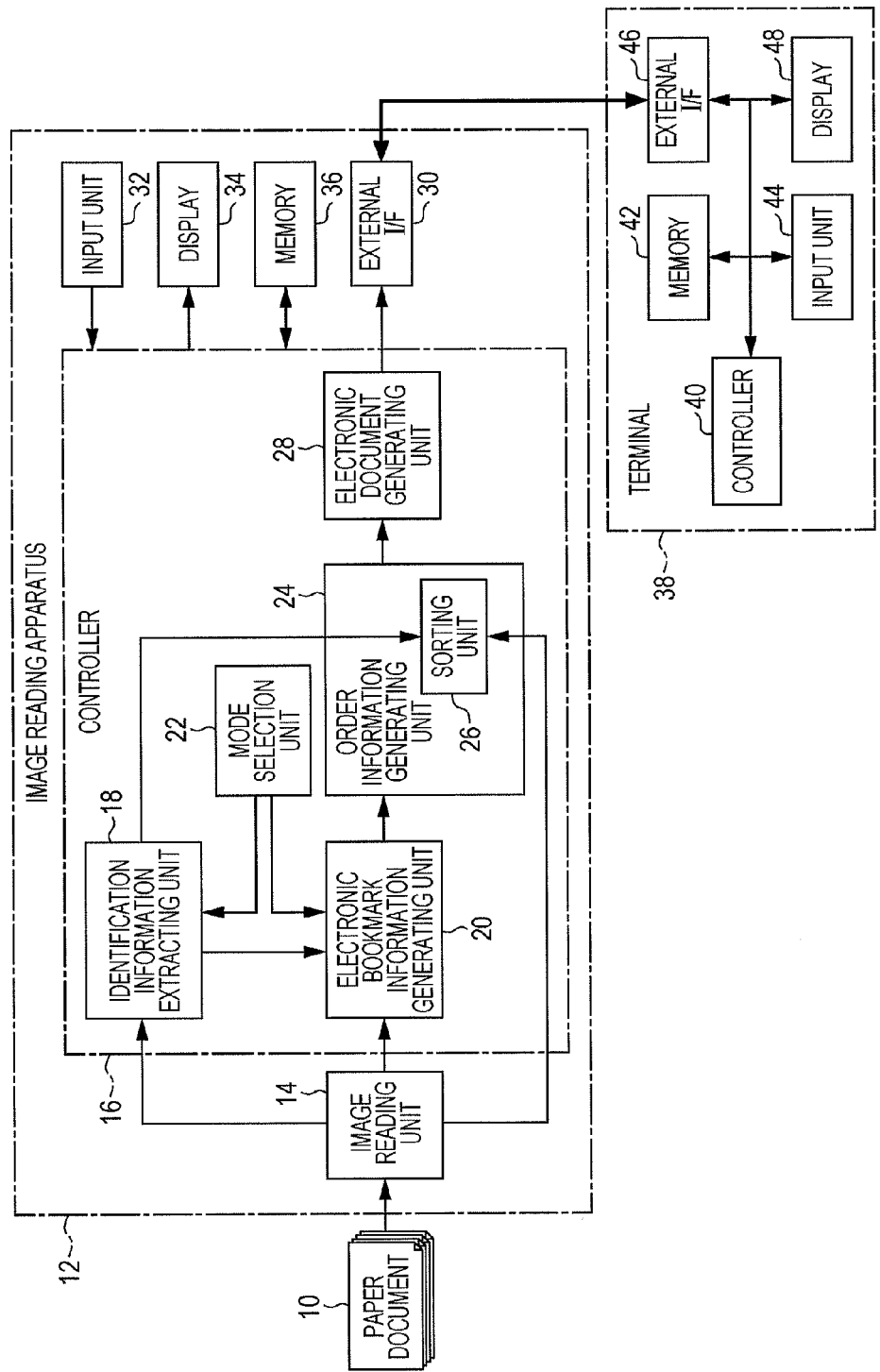
FIG. 1 is a schematic diagram illustrating configurations of an image reading apparatus according to the present exemplary embodiment and a peripheral device.

FIG. 1 is a schematic diagram illustrating configurations of the image reading apparatus according to the present exemplary embodiment and a peripheral device. FIG. 1 illustrates an image reading apparatus 12 according to the present exemplary embodiment and a terminal 38, which is a peripheral device.

Figure 2B:
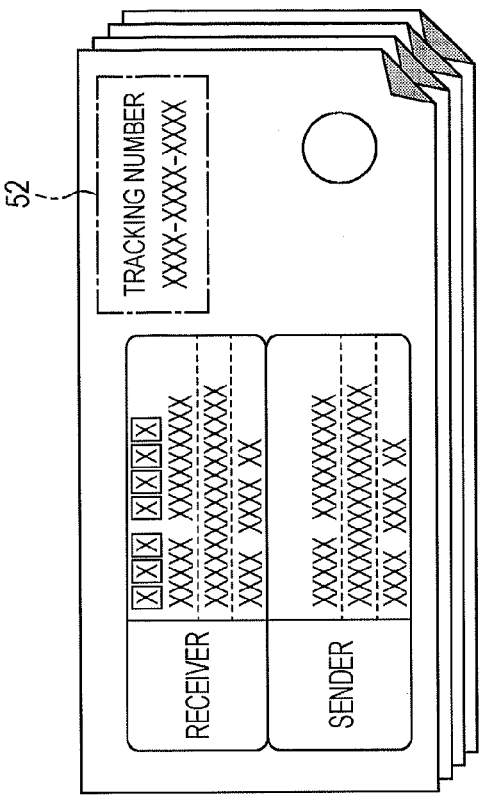
FIGS. 2A and 2B are diagrams illustrating examples of a paper document group.
Figure 2A:
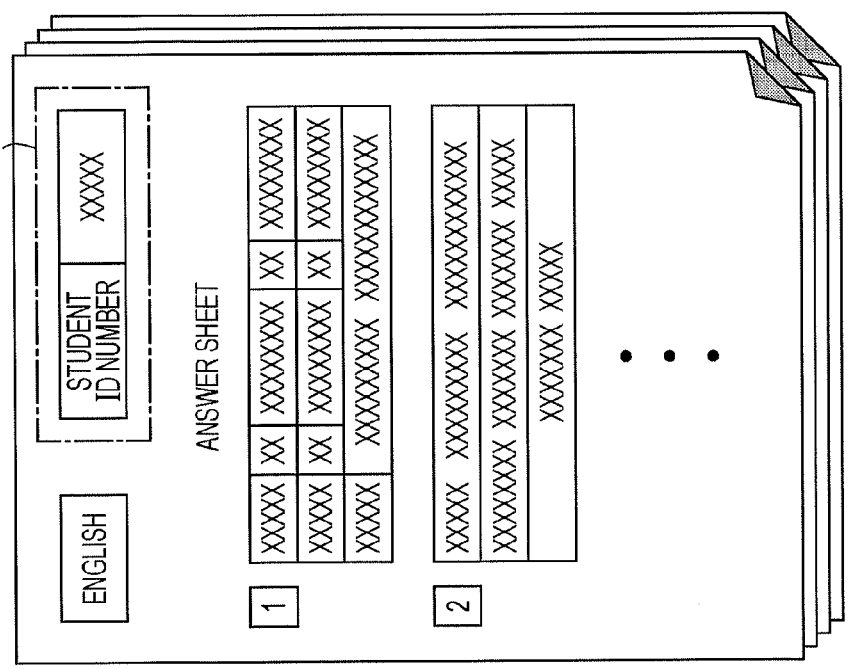

A paper document group 10 is formed of plural paper documents. FIGS. 2A and 2B are diagrams illustrating examples of the paper document group 10. In the present exemplary embodiment, test answer sheets of students in a particular grade at a school are used as the paper document group 10. Each student's test answer sheet is one paper document. FIG. 2A illustrates an example of one of the test answer sheets. In each of the test answer sheets, a student identification (ID) number that denotes one of the students is to be written down in a predetermined location 50 (at the upper right in the example illustrated in FIG. 2A) by the student. Instead of or in addition to a student ID number, the name of a student may be written down. The paper documents, which are included in the paper document group 10, may be identified by the student ID numbers or the names of the students that are written in the paper documents. In other words, the student ID numbers and the names of the students are identification information items that are used to identify the paper documents.

The number of pages of each student's test answer sheet is one, and all the plural paper documents, which are included in the paper document group 10, have the same form. The student ID numbers are written in the predetermined locations 50 in all the paper documents. In addition, the number of pages of each student's test answer sheet may be two, and the student ID numbers may only be written in the predetermined locations 50 on the first page. In this case, the paper documents, which are included in the paper document group 10, are each formed of two sheets. Alternatively, the number of pages of the test answer sheets may vary depending on the student. In the cases, the student ID numbers or the names of the students are written down in the predetermined locations 50 at the upper right of the first pages of the test answer sheets.

Another example of the paper document group 10 may be, for example, plural shipping labels such as those illustrated in FIG. 2B. Also in such shipping labels, tracking numbers that are identification information items that are used to identify the shipping labels are written in predetermined locations 52, one of which is illustrated in FIG. 2B. As described above, the paper documents of the paper document group 10 may be any documents as long as an identification information item is written in a predetermined location in each of the documents.

Each of the identification information items, which are written down in the paper documents of the paper document group 10, may be a character string including numbers as in the above-described examples or may be a symbol, a design, or the like such as a bar code or a QR Code (Registered Trademark) as long as a character string by which one of the paper documents may be identified may be acquired from the identification information item.

Returning to FIG. 1, the image reading apparatus 12 is a multifunction machine that has a scanner function, a copy function, a print function, and the like. Alternatively, the image reading apparatus 12 may be a scanner that has only a scanner function. The image reading apparatus 12 includes an image reading unit 14, a controller 16, an external interface (I/F) 30, an input unit 32, a display 34, and a memory 36. Functions of the units, which are included in the image reading apparatus 12, may be realized by programs. The programs are stored in the memory 36.

The image reading unit 14 is, for example, the scanner function of the multifunction machine and optically reads the paper documents, which are included in the paper document group 10, in such a manner as to generate image data items. The image reading unit 14 includes a tray in which the plural paper documents may be set, and the plural paper documents are fed from the tray into the image reading unit 14 by an automatic document feed unit (not illustrated), so that the plural paper documents may be read by the image reading unit 14 in a continuous manner. In the case where each of the paper documents, which are included in the paper document group 10, is formed of one sheet, image data items, each of which corresponds to one of the paper documents, are generated. Therefore, plural image data items are generated by reading the plural paper documents. In the case where the paper documents are each formed of plural sheets, image data items, each of which corresponds to a sheet of the paper documents, are generated.

At a later time, one electronic document each page of which is formed of one of the image data items will be generated by an electronic document generating unit 28. In the present specification, an electronic file having plural pages that is generated as a result of the paper document group 10 being read will be hereinafter referred to as an electronic document, and data items each of which forms one of the pages of such an electronic document will be hereinafter referred to as image data items or image information items.

The image reading unit 14 acquires the order in which image data items have been acquired as the number of pages of an electronic document and associates the number of pages of the electronic document with the image data items. For example, the image reading unit 14 sets an image data item that has been acquired by reading the first page of a paper document to the first page and sets an image data item that has been acquired by reading the second page of the paper document to the second page. Regarding information that indicates the number of pages of the electronic document, information that indicates corresponding relationships between page numbers and the image data items may be included in the electronic document or may be included in the image data items themselves.

The controller 16 includes an identification information extracting unit 18, an electronic bookmark information generating unit 20, a mode selection unit 22, an order information generating unit 24, and the electronic document generating unit 28. The order information generating unit 24 includes a sorting unit 26.

The identification information extracting unit 18 extracts an identification information item from an image data item that has been generated by the image reading unit 14. More specifically, the identification information extracting unit 18 performs optical character recognition (OCR) processing on the image data item and extracts a student ID number, which is an identification information item, as a character string from the image data item. In the case where a symbol, a design, or the like such as a bar code or a QR code is written as an identification information item, the identification information extracting unit 18 extracts a character string that corresponds to the symbol, the design, or the like by reading the symbol, the design, or the like. A character string that is to be extracted by the identification information extracting unit 18 and that will be included in an electronic bookmark information item, which will be described later, denotes a computer recognizable character code string.

The identification information extracting unit 18 performs OCR processing on an area that is specified by a user in an image data item. For example, the identification information extracting unit 18 divides an image data item into six equal areas and allows a user to specify one of the areas on which the OCR processing is to be performed. Obviously, the area that is specified by a user is an area in which an identification information item has been written. Alternatively, the OCR processing may be performed on all the areas of the image data item without specifying any area. However, in the case where the OCR processing is performed on all the areas, a probability of false recognition of the identification information item increases, and the processing time increases. Thus, the OCR processing may be performed only on a specified predetermined area.

The electronic bookmark information generating unit 20 generates plural electronic bookmark information items that correspond to the plural image data items. When an electronic document is displayed, electronic bookmarks each of which is associated with one of the pages of the electronic document are displayed along with plural image data items each of which forms one of the pages the electronic document. A user may immediately open one of the pages of the electronic document by clicking one of the electronic bookmarks associated with the page. The electronic bookmarks are to be displayed on the basis of electronic bookmark information items that are added to the electronic document. The electronic bookmark information generating unit 20 generates electronic bookmark information items, which are data items to be included in an electronic document, in order to display electronic bookmarks.

Each of the electronic bookmark information items includes a character string that denotes a student ID number, which is an identification information item that is extracted by the identification information extracting unit 18. In the case where the identification information item is a symbol, a design, or the like, each of the electronic bookmark information items includes a character string that may be read from the symbol, the design, or the like. In addition, each of the electronic bookmark information items includes a bookmark name information item that indicates a bookmark name that is to be displayed along with the electronic bookmark. Each of the bookmark names may include only a student ID number (e.g., "10001"), which is an identification information item that has been extracted, or a predetermined character string, for example, "Student ID Number:" may be added in such a manner that each of the bookmark names is, for example, "Student ID Number: 10001". In addition, for example, a table or the like in which student ID numbers and the names of students are associated with one another may be provided in a database (DB) that is not illustrated and that is prepared so as to reside outside or within the image reading apparatus 12, and the names of the students may be acquired from the student ID numbers by referring to the table and may become bookmark names or may be added to the bookmark names.

The electronic bookmark information items that have been generated are associated with their respective image data items. More specifically, each of the image data items and one of the electronic bookmark information items that includes an identification information item that has been extracted from the image data item are associated with each other. Each of the image data items and the corresponding electronic bookmark information item are associated with each other by adding, to the electronic document, an information item that indicates the corresponding relationship between the page number of the image data item that has been acquired by the image reading unit 14 and the electronic bookmark information item that includes an identification information item that has been extracted from the image data item. Alternatively, an information item that indicates the page number of the image data item may be added to the electronic bookmark information item.

The mode selection unit 22 selects the operation mode of the electronic bookmark information generating unit 20. A page specification mode and an automatic mode are prepared for the operation mode. Operation of the identification information extracting unit 18 is to be changed in accordance with the operation mode of the electronic bookmark information generating unit 20. One of these modes is selected by a user, and the mode selection unit 22 sets the operation mode of the electronic bookmark information generating unit 20 to the mode that is selected by the user.

In the page specification mode, an electronic bookmark is only added to a page of an electronic document that is specified by a user. In other words, an electronic bookmark information item is generated by extracting an identification information item from an image data item of the page that is specified by the user, and the electronic bookmark information item is associated with the image data item. An example of the conditions that may be added when a user specifies some of the pages of an electronic document is "one electronic bookmark is added for every two pages". Obviously, one electronic bookmark may be added for every any number of pages, and this may be changed by the user in accordance with the configuration of a paper document.

The page specification mode is effective in the case where individual paper documents, which are included in the paper document group 10, have the same number of pages, and where one electronic bookmark is desired to be added to each of the paper documents. An example of such a case is that of each student's answer sheet having two pages. In this case, considering the convenience of the answer sheets after being converted to an electronic format, an electronic bookmark may only be added to the first page of each student's answer sheet. Therefore, in such a case, the condition of "one electronic bookmark is added for every two pages" is added in the page specification mode, so that electronic bookmark information items, each of which corresponds only to an image data item that is acquired by reading the first page of each student's answer sheet, may be generated.

In the automatic mode, the electronic bookmark information generating unit 20 identifies a page to which an electronic bookmark is to be added and adds an electronic bookmark only to the page that has been determined as a page to which an electronic bookmark is to be added. More specifically, in the automatic mode, OCR processing is performed on all the image data items that have been generated by the image reading unit 14, and in the case where an identification information item is extracted from one of the image data items, an electronic bookmark information item that correspond to the image data item is generated. Since the OCR processing is performed on all the image data items in the automatic mode, an area on which the OCR processing is to be performed may be specified in advance in order to reduce the time taken for the OCR processing and a probability of false recognition of identification information items. In order to confirm that the identification information items that have been extracted are appropriate identification information items that may be used to identify the paper documents of the paper document group 10, for example, a condition such as, for example, "each extracted identification information item is a five-digit number" may be added, and when the condition is satisfied, it may be determined that the identification information items have been extracted from the image data items.

The automatic mode is effective in the case where individual paper documents, which are included in the paper document group 10, have different numbers of pages, and where one electronic bookmark is desired to be added to each of the paper documents. An example of such a case is that the number of pages differs between answer sheets depending on the student, and that student ID numbers are only written on the first pages. In such a case, by selecting the automatic mode, electronic bookmark information items that correspond only to image data items that are acquired by reading the first page of each student's answer sheet among the paper document group 10 may be generated.

The order information generating unit 24 generates an order information item that indicates the order in which plural electronic bookmarks, which correspond to their respective electronic bookmark information items, are displayed when the plural electronic bookmarks are displayed. In the electronic document generated in the present exemplary embodiment, electronic bookmarks are displayed in an order that is the same as an arrangement order of the corresponding electronic bookmark information items in the data structure of the electronic document. In other words, it may be said that the arrangement order of the electronic bookmark information items is the order information item that indicates the display order of the electronic bookmarks. Therefore, when plural electronic bookmark information items are generated and an arrangement order thereof is determined, an order information is also generated, and in this case, the electronic bookmark information generating unit 20 includes the function of the order information generating unit 24. The order information generating unit 24 may separately generate an information item that indicates a display order of the electronic bookmarks, which correspond to their respective electronic bookmark information items, and may add the respective information item to the electronic document, particularly the electronic bookmark information items.

When the electronic bookmark information generating unit 20 has generated the electronic bookmark information items, the order of the electronic bookmark information items, that is, the display order of the electronic bookmarks is the same as the order of the page numbers of the image data items that have been associated with their respective electronic bookmark information items. For example, one of the electronic bookmark information items that is associated with the image data item, which is the first page, is set to be the first item, and one of the electronic bookmark information items that is associated with the image data item, which is the second page, is set to be the second item.

The sorting unit 26, which is included in the order information generating unit 24, performs processing for rewriting the order information item. As described above, in the present exemplary embodiment, an arrangement order of plural electronic bookmark information items indicates a display order of electronic bookmarks, and thus, the sorting unit 26 performs processing for rearranging an arrangement order of the plural electronic bookmark information items. More specifically, the sorting unit 26 sorts electronic bookmark information items on the basis of identification information items that are included in the electronic bookmark information items. For example, the sorting unit 26 sorts electronic bookmark information items in such a manner that student ID numbers, which are identification information items, are arranged in ascending order. Obviously, the sorting unit 26 may sort the electronic bookmark information items in such a manner that student ID numbers are arranged in descending order or may sort the electronic bookmark information items on the basis of the names of the students that correspond to their respective student ID numbers and that are acquired from the DB. In the case where an order information item is separately generated, the sorting unit 26 rewrites the order information item on the basis of the identification information items, which are included in the electronic bookmark information items, in such a manner as to change the display order of the electronic bookmarks in a similar manner to the above.

In the paper document group 10, the paper documents are not always in proper order. Taking answer sheets as an example, answer sheets are usually collected in the order in which students are seated, and such students are often not seated in the order of student ID numbers. Thus, the order in which the paper documents of the paper document group 10 are arranged, that is, the order in which the image data items that are generated by the image reading unit 14 are arranged is highly likely to differ from the order of the student ID numbers, and the order in which the electronic bookmark information items that have been generated by the electronic bookmark information generating unit 20 are arranged is also highly likely to differ from the order of the student ID numbers. Accordingly, the electronic bookmark information items are sorted by the sorting unit 26 on the basis of the student ID numbers.

Although the sorting unit 26 rearranges the display order of electronic bookmarks, the sorting unit 26 does not rearrange the order of image data items, that is, the order in which the image data items are paginated in an electronic document, and maintains the order in which the image data items are read by the image reading unit 14.

On the other hand, the sorting unit 26 may be configured to perform processing for rearranging the order of the electronic bookmark information items and the order of the image data items. For example, in the case where the order of an electronic bookmark information item that corresponds to an image data item A that is the first page and the order of an electronic bookmark information item that corresponds to an image data item B that is the second page are reversed, the order of the image data item A and the order of the image data item B may be also reversed in such a manner that the image data item B and the image data item A become the first page and the second page, respectively, of an electronic document.

Image data items are sorted along with electronic bookmark information items, so that the electronic bookmark information items and the image data items are arranged in the same order. This is effective in the case where, for example, electronic bookmarks that are to be displayed are desired to be utilized as a table of contents.

The electronic document generating unit 28 generates an electronic document that has plural pages. The electronic document may be, for example, a PDF file. The electronic document includes plural image data items and plural electronic bookmark information items that have been sorted. The electronic document is formed of plural image data items that are generated by the image reading unit 14. The electronic document generating unit 28 generates one electronic document for one paper document group 10.

In addition, although in the case where one paper document group 10 is divided into plural electronic documents, the order information of paper documents of the paper document group 10 will be lost due to electronization, the order information of the paper documents of the paper document group 10 may remain in the electronic document by generating only one electronic document while not sorting image data items. Also in this case, electronic bookmarks will be displayed in a state of being sorted by previously sorting electronic bookmark information items that correspond to their respective image data items, and thus, the searchability of the data items will not deteriorate.

Figure 3:
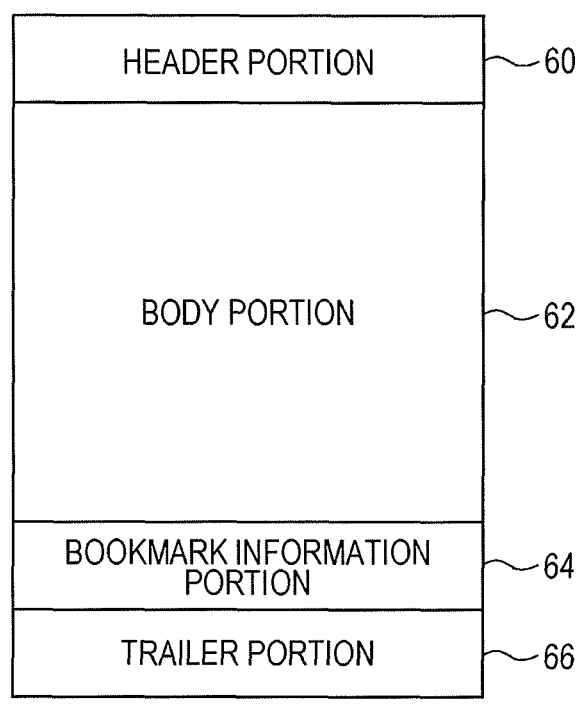
FIG. 3 is a diagram illustrating a data structure of an electronic document to which electronic bookmark information items have been added.

FIG. 3 is a diagram illustrating a data structure of an electronic document to which electronic bookmark information items have been added. The electronic document includes a header portion 60 that includes the version information of the electronic document and the like, a body portion 62 that includes actual data items such as the contents of the electronic document, that is, image data items, a bookmark information portion 64 that includes electronic bookmark information items, and a trailer portion 66 in which comprehensive data items of the electronic document are put together. The bookmark information portion 64 includes plural electronic bookmark information items that have been generated by the electronic bookmark information generating unit 20 and that are arranged in the order rearranged by the sorting unit 26.

Returning to FIG. 1, the external I/F 30 is an external input/output interface that connects the image reading apparatus 12 and another device. Examples of the external I/F 30 are a USB terminal and a LAN card. The external I/F 30 may be connected to the other device via a cable or may be connected to the other device by a wireless connection. An electronic document that has been generated by the electronic document generating unit 28 is to be transmitted to the other device via the external I/F 30.

The input unit 32 is a unit that is used for inputting an instruction from a user to the image reading apparatus 12, and an example of the input unit 32 is an operation panel. The input unit 32 is to be used by a user in order to input an instruction to specify a predetermined area of an image data item on which OCR processing is to be performed, an instruction to specify the operation mode of the electronic bookmark information generating unit 20, and other instructions.

The display 34 is, for example, a liquid crystal display monitor and is configured to display the contents of processing that is to be performed by the image reading apparatus 12 and the contents of an instruction from a user. Such a liquid crystal display monitor, which is the display 34, may be a touch panel, and in this case, the liquid crystal display monitor has the functions of the display 34 and the input unit 32. The display 34 may be configured to capable of displaying an electronic document that is generated by the electronic document generating unit 28.

The memory 36 is, for example, a ROM or a RAM, and programs for operating each unit of the image reading apparatus 12 are stored in the memory 36. Alternatively, processing data of each of the units is temporarily stored in the memory 36.

The terminal 38 is, for example, a personal computer or a tablet terminal and includes a controller 40, which is a CPU or the like, a memory 42, which is a ROM, a RAM, or the like, an input unit 44, which is a keyboard, a mouse, or the like, an external interface (I/F) 46, which is a USB terminal, a LAN card, or the like, and a display 48, which is a monitor or the like. The controller 40 receives an electronic document from the image reading apparatus 12 via the external I/F 46 and stores the electronic document into the memory 42. The controller 40 causes the display 48 to display the electronic document, so that a user who uses the terminal 38 may be able to view the electronic document.

Figure 4:
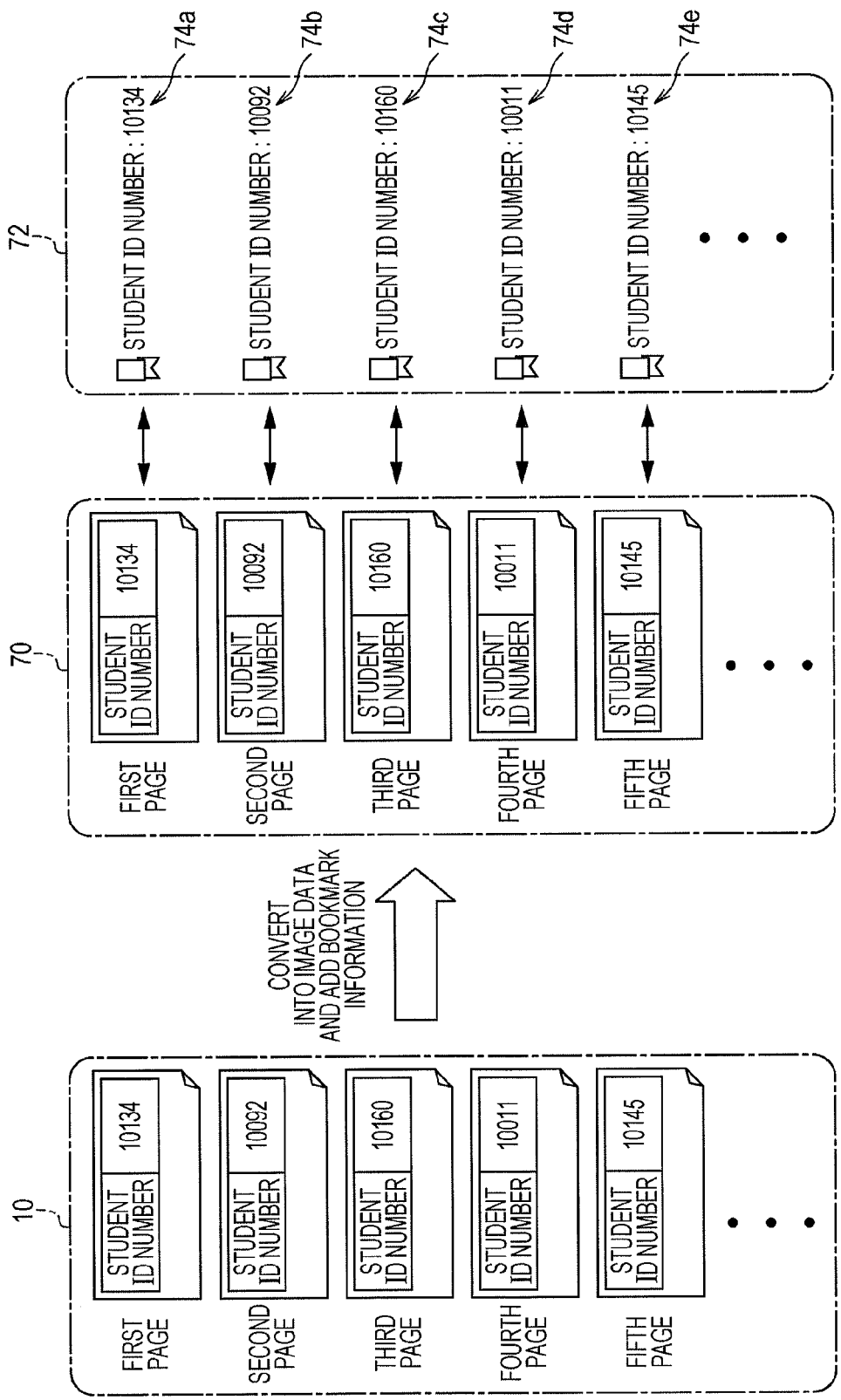
FIG. 4 is a conceptual diagram illustrating corresponding relationships between electronic bookmark information items and image data items.

FIG. 4 is a conceptual diagram illustrating corresponding relationships between electronic bookmark information items and image data items. In the present exemplary embodiment, the paper document group 10 is formed of a hundred and several tens of answer sheets, and the first to fifth pages of the answer sheets are illustrated in FIG. 4. Since the plural answer sheets are collected in the order in which students are seated or the like, the answer sheets are not arranged in the order of student ID numbers of the students. When the answer sheets of the paper document group 10 are set in the tray of the image reading unit 14 read in a continuous manner, an image data item group 70 is generated. Since page numbers are assigned to image data items of the image data item group 70 in the order in which the answer sheets have been read by the image reading unit 14, as described above, one of the image data items that has been acquired by reading the first page of the paper document group 10 becomes the first page of the image data item group 70, and one of the image data items that has been acquired by reading the second page of the paper document group 10 becomes the second page of the image data item group 70. Similarly, page numbers are assigned to the rest of image data items.

After the image data item group 70 has been generated, the electronic bookmark information generating unit 20 generates an electronic bookmark information item group 72 that are formed of electronic bookmark information items each of which is associated with one of the image data items. In FIG. 4, corresponding relationships between the electronic bookmark information items and the image data items are indicated by arrows. A character string (e.g., "Student ID Number: 10134") that is included in the electronic bookmark information item group 72 is a bookmark name information item that is included in one of the electronic bookmark information items. For example, an electronic bookmark information item 74a that has, as a bookmark name, an identification information item "Student ID Number: 10134" that has been extracted from one of the image data items, which is the first page, is associated with the image data item, which is the first page. Similarly, the image data items, which are the second to fifth pages, are associated with electronic bookmark information items 74b to 74e, respectively. Although not illustrated in FIG. 4, the image data items, which are the sixth and subsequent pages, are associated with their respective image data items in a similar manner to the above. As described above, when the electronic bookmark information generating unit 20 has generated the electronic bookmark information items, the order in which the electronic bookmark information items are arranged is the same as the order in which the corresponding image data items are paginated.

Figure 5:
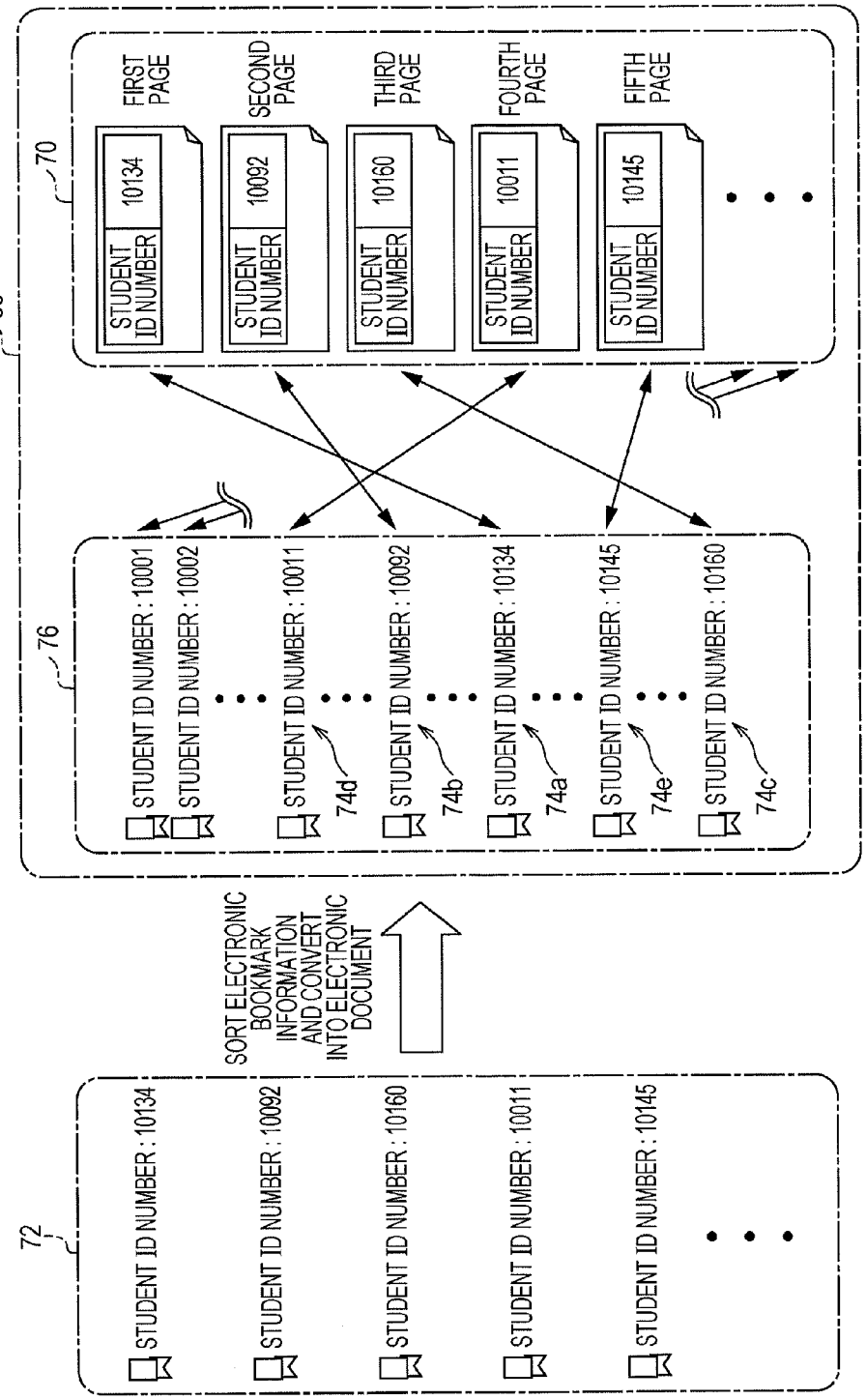
FIG. 5 is a conceptual diagram illustrating corresponding relationships between electronic bookmark information items that have been sorted and image data items.

FIG. 5 is a conceptual diagram illustrating corresponding relationships between electronic bookmark information items that have been sorted and image data items. An electronic bookmark information item group 76 that includes electronic bookmark information items that have been sorted is illustrated in FIG. 5. Similarly to FIG. 4, in FIG. 5, the corresponding relationships between the electronic bookmark information items and the image data items are indicated by arrows. In the electronic bookmark information item group 76, the electronic bookmark information items that have been sorted are the electronic bookmark information items of the electronic bookmark information item group 72 that have been sorted in such a manner that identification information items that are included in the electronic bookmark information items, that is, the student ID numbers are arranged in ascending order. Although the electronic bookmark information items are sorted, the corresponding relationships between the electronic bookmark information items 74a to 74e and the image data items, which are the first to fifth pages, are maintained. The image data item group 70 and the electronic bookmark information item group 76, which includes the electronic bookmark information items that have been sorted, are coupled to each other, and as a result, an electronic document 80 is generated.

Figure 6:
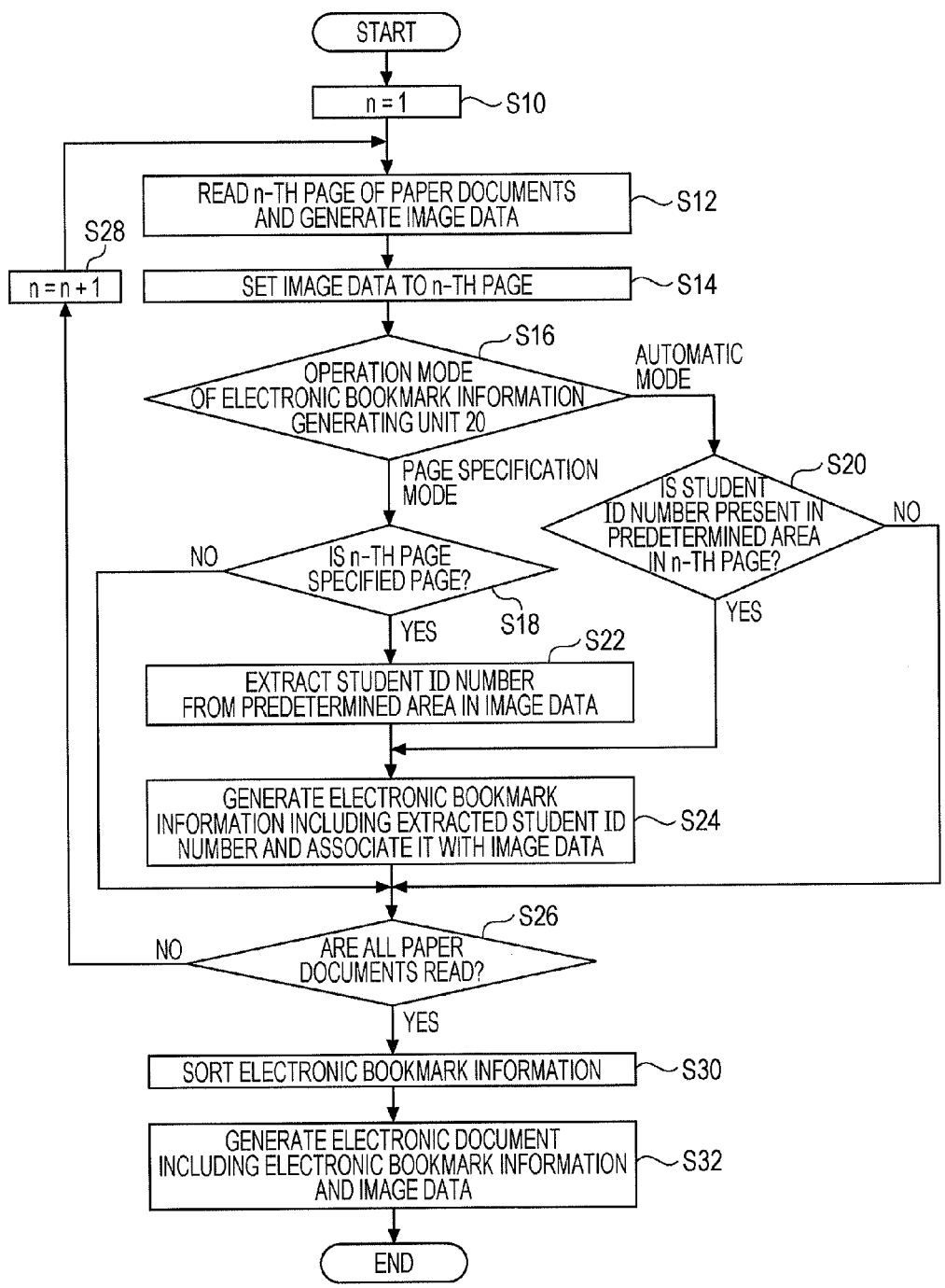
FIG. 6 is a flowchart illustrating the flow of processes performed by the image reading apparatus of the present exemplary embodiment.

FIG. 6 is a flowchart illustrating the flow of processes performed by the image reading apparatus 12 in the present exemplary embodiment. The flowchart illustrated in FIG. 6 will be described below with reference to FIG. 1.

In step S10, the value of n is initialized with 1. Here, n denotes the page number of the paper document group 10 that is to be read, and n is a variable that denotes the page number of an image data item.

In step S12, the image reading unit 14 optically reads an n-th paper document of the paper document group 10 and generates one image data item.

In step S14, the image reading unit 14 sets the page number of the image data item that has been generated in step S12 to be the n-th page.

In step S16, the electronic bookmark information generating unit 20 determines the operation mode of the electronic bookmark information generating unit 20. In the case where the operation mode has been set to the page specification mode, the process moves on to step S18, and in the case where the operation mode has been set to the automatic mode, the process moves on to step S20.

In step S18, the electronic bookmark information generating unit 20 determines whether or not the n-th page is a page that has been specified by a user. For example, in the case where a condition of "one electronic bookmark is added for every two pages" is made by the user in the page specification mode, when n is an odd number, the electronic bookmark information generating unit 20 determines that the n-th page is the specified page, and when n is an even number, the electronic bookmark information generating unit 20 determines that the n-th page is not the specified page.

In step S20, the identification information extracting unit 18 determines whether or not a student ID number, which is an identification number, is present in a predetermined area of the image data item that has been generated in step S12. More specifically, the identification information extracting unit 18 performs OCR processing on the predetermined area of the image data item that has been specified by the user, and the identification information extracting unit 18 determines that a student ID number is present in the predetermined area when the identification information extracting unit 18 has extracted a five-digit number as a character string, and otherwise determines that a student ID number is not present in the predetermined area.

In step S22, the identification information extracting unit 18 performs the OCR processing on the predetermined area of the image data item and extracts a character string that denotes a student ID number, which is an identification information item.

In step S24, the electronic bookmark information generating unit 20 generates an electronic bookmark information item that includes the character string that has been extracted in step S20 or step S22. In addition, the electronic bookmark information generating unit 20 associates the electronic bookmark information item, which has been generated, with the image data item, which is the n-th page.

In step S26, the image reading unit 14 determines whether or not all the paper documents set in the tray have been read. This determination process is performed by, for example, checking whether or not any of the paper documents is left in the tray.

In the case where it is determined that some of the paper documents have not yet been read in step S26, the process moves on to step S28, and n is incremented in step S28. Then, the process starting from step S12 is performed again on the next one of the paper documents.

When all of the paper documents have been read, in step S30, the sorting unit 26 performs processing for sorting the electronic bookmark information items. The electronic bookmark information items are sorted in such a manner that the student ID numbers that are included in the electronic bookmark information items are arranged in ascending order.

In step S32, the electronic document generating unit 28 generates one electronic document by coupling an image data item group and an electronic bookmark information item group. Each of the pages of the electronic document is one of the image data items that have been generated in step S12. The electronic document includes the plural electronic bookmark information items that have been generated in step S24 and sorted in step S30.

Figure 7:
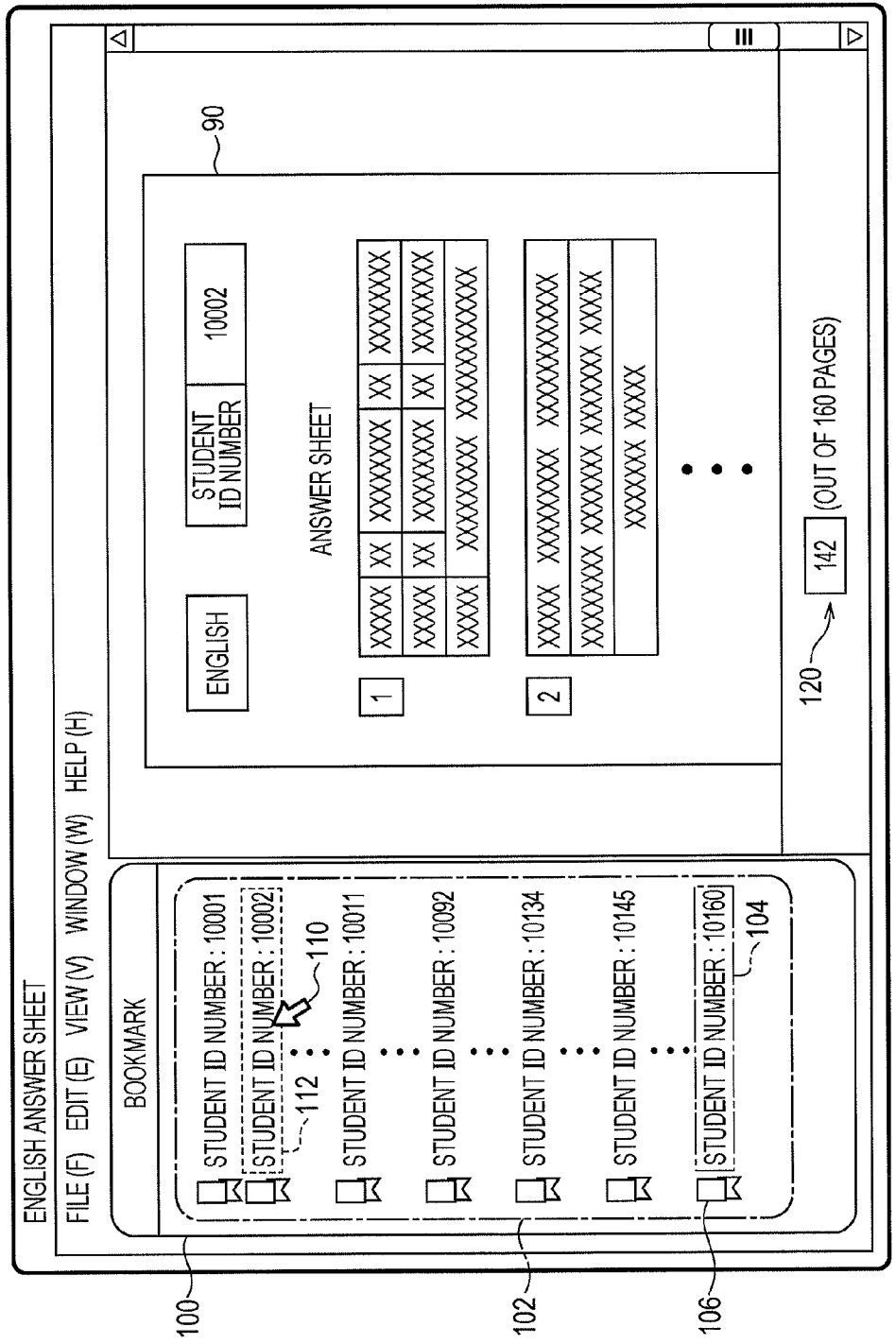
FIG. 7 is a diagram illustrating the state of an electronic document that includes electronic bookmark information items, which have been sorted, the electronic document being displayed.

FIG. 7 is a diagram illustrating the state of an electronic document that includes electronic bookmark information items, which have been sorted, being displayed. For example, in the terminal 38 illustrated in FIG. 1, when an electronic document that has been generated by the image reading apparatus 12 is processed by an appropriate application, a screen such as that illustrated in FIG. 7 is displayed on the display 48. The application includes an image data display 90 on which image data items, which are text data items of the electronic document, are to be displayed, a bookmark display 100 on which an electronic bookmark group 102 is to be displayed, and a page number display 120 on which the page number of the image data item, which is displayed on the image data display 90, is to be displayed.

Electronic bookmarks that are included in the electronic bookmark group 102 are displayed on the bookmark display 100 in the order in which the corresponding electronic bookmark information items have been sorted. Each of the electronic bookmarks, which are included in the electronic bookmark group 102, includes a bookmark name 104 and a bookmark icon 106. When one of the electronic bookmarks is clicked with a pointer 110, a page that has been associated with the electronic bookmark is displayed on the image data display 90. In FIG. 7, the case where one of the electronic bookmarks that includes the bookmark name 104 "Student ID Number: 10002" has been clicked, and where one of the image data items that corresponds to the electronic bookmark has been displayed on the image data display 90 is illustrated. Note that a frame 112 that is illustrated around the periphery of the bookmark name 104 is a frame that indicates an electronic bookmark that corresponds to the page that is currently displayed on the image data display 90.

In the electronic document illustrated in FIG. 7, although the electronic bookmark information items have been sorted, the image data items have not been sorted and are kept in the order in which the image data items have been read by the image reading unit 14. Therefore, as illustrated in FIG. 7, the page number of the image data item that corresponds to the second electronic bookmark that includes the bookmark name 104 "Student ID Number: 10002" is 142.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a processor configured to execute:
an extracting unit configured to extract identification information items from image information items of a document group that includes a plurality of individual documents, each of the identification information items being included in a corresponding one of the individual documents;
a corresponding information generating unit configured to generate corresponding information items that indicate corresponding relationships between the identification information items and the image information items of the individual documents;
an operation mode selection unit configured to select, as an operation mode of the corresponding information generating unit, one of a first mode in which one of the corresponding information items that corresponds to a predetermined one of the image information items is generated, and a second mode in which, when the extracting unit has extracted the identification information items from the predetermined areas of the image information items, the corresponding information items that correspond to the image information items are generated; and
an electronic document generating unit configured to rearrange an order of the identification information items on a basis of contents of the identification information items and generate an electronic document that includes the image information items of the document group, the corresponding information items, and the identification information items that have been sorted,
wherein in the first mode, only individual documents among the plurality of individual documents having the corresponding information items match the predetermined one of the image information items are designated to be rearranged by the electronic document generating unit, while the remaining individual documents are arranged in the order of the scan with respect to the rearranged individual documents, or
wherein in the second mode, only individual documents among the plurality of individual documents having the identification information are bookmarked, while the remaining individual documents are designated to be rearranged by the electronic document generating unit, while the remaining individual documents are arranged in the order of the scan with respect to the rearranged individual documents.

2. The image processing apparatus according to claim 1, further comprising:
a controller configured to cause a display to display the identification information items and perform, after one of the displayed identification information items has been selected, control in such a manner that one of the image information items of the individual documents that corresponds to the identification information item is displayed on a basis of a corresponding one of the corresponding information items.

3. The image processing apparatus according to claim 1, wherein the electronic document generating unit does not rearrange an order of the image information items of the document group of the electronic document when the electronic document generating unit sorts the identification information items.

4. The image processing apparatus according to claim 1, wherein the extracting unit is configured to extract the identification information items from predetermined areas of the image information items.

5. The image processing apparatus according to claim 2, wherein the extracting unit is configured to extract the identification information items from predetermined areas of the image information items.

6. The image processing apparatus according to claim 4, wherein the corresponding information generating unit is configured to generate the corresponding information items that correspond to the image information items when the extracting unit has extracted the identification information items from the predetermined areas of the image information items.

7. The image processing apparatus according to claim 5, wherein the corresponding information generating unit is configured to generate the corresponding information items that correspond to the image information items when the extracting unit has extracted the identification information items from the predetermined areas of the image information items.

8. The image processing apparatus according to claim 1, wherein the extracting unit is configured to extract character strings as the identification information items.

9. The image processing apparatus according to claim 2, wherein the extracting unit is configured to extract character strings as the identification information items.

10. An image reading apparatus comprising:
an reading unit configured to read a document group that includes a plurality of individual documents;
an extracting unit configured to extract identification information items from image information items of the document group that has been read by the reading unit and that includes the plurality of individual documents, each of the identification information items being included in a corresponding one of the individual documents;
a corresponding information generating unit configured to generate corresponding information items that indicate corresponding relationships between the identification information items and the image information items of the individual documents;
an operation mode selection unit configured to select, as an operation mode of the corresponding information generating unit, one of a first mode in which one of the corresponding information items that corresponds to a predetermined one of the image information items is generated, and a second mode in which, when the extracting unit has extracted the identification information items from the predetermined areas of the image information items, the corresponding information items that correspond to the image information items are generated; and
an electronic document generating unit configured to rearrange an order of the identification information items on a basis of contents of the identification information items and generate an electronic document that includes the image information items of the document group, the corresponding information items, and the identification information items that have been sorted,
wherein in the first mode, only individual documents among the plurality of individual documents having the corresponding information items match the predetermined one of the image information items are bookmarked, while the remaining individual documents are designated to be rearranged by the electronic document generating unit, while the remaining individual documents are arranged in the order of the scan with respect to the rearranged individual documents, or
wherein in the second mode, only individual documents among the plurality of individual documents having the identification information are bookmarked, while the remaining individual documents are designated to be rearranged by the electronic document generating unit, while the remaining individual documents are arranged in the order of the scan with respect to the rearranged individual documents.

11. A non-transitory computer readable medium storing a program causing a computer to function as:
an extracting unit configured to extract identification information items from image information items of a document group that includes a plurality of individual documents, each of the identification information items being included in a corresponding one of the individual documents;
a corresponding information generating unit configured to generate corresponding information items that indicate corresponding relationships between the identification information items and the image information items of the individual documents;
an operation mode selection unit configured to select, as an operation mode of the corresponding information generating unit, one of a first mode in which one of the corresponding information items that corresponds to a predetermined one of the image information items is generated, and a second mode in which, when the extracting unit has extracted the identification information items from the predetermined areas of the image information items, the corresponding information items that correspond to the image information items are generated; and
an electronic document generating unit configured to rearrange an order of the identification information items on a basis of contents of the identification information items and generate an electronic document that includes the image information items of the document group, the corresponding information items, and the identification information items that have been sorted,
wherein in the first mode, only individual documents among the plurality of individual documents having the corresponding information items match the predetermined one of the image information items are bookmarked, while the remaining individual documents are designated to be rearranged by the electronic document generating unit, while the remaining individual documents are arranged in the order of the scan with respect to the rearranged individual documents, or wherein in the second mode, only individual documents among the plurality of individual documents having the identification information are bookmarked, while the remaining individual documents are designated to be rearranged by the electronic document generating unit, while the remaining individual documents are arranged in the order of the scan with respect to the rearranged individual documents.

* * * * *